US008612354B2

(12) United States Patent
Tang-Talpin et al.

(10) Patent No.: US 8,612,354 B2
(45) Date of Patent: Dec. 17, 2013

(54) METHOD FOR CONTROLLING DIGITAL RIGHTS OF THE "PLAY N TIMES" TYPE FOR A DIGITAL AUDIO AND/OR VIDEO CONTENT AND DEVICE IMPLEMENTING THIS METHOD

(75) Inventors: Yan-Mei Tang-Talpin, St-Grégoire (FR); Alain Durand, Rennes (FR); Fabien Battini, Thorigné-Fouillard (FR); Jean-Louis Diascorn, Betton (FR); Eric Diehl, Liffré (FR)

(73) Assignee: Thomson Licensing, Boulogne Billancourt (FR)

( * ) Notice: Subject to any disclaimer, the term of this patent is extended or adjusted under 35 U.S.C. 154(b) by 1883 days.

(21) Appl. No.: 11/482,309

(22) Filed: Jul. 7, 2006

(65) Prior Publication Data
US 2007/0112580 A1 May 17, 2007

(30) Foreign Application Priority Data
Jul. 7, 2005 (FR) .................................... 05 52081

(51) Int. Cl.
G06F 21/00 (2013.01)
(52) U.S. Cl.
USPC ............................................. 705/59; 705/52
(58) Field of Classification Search
USPC .................................................. 705/52, 59
See application file for complete search history.

(56) References Cited

U.S. PATENT DOCUMENTS 5,260,999 A * 11/1993 Wyman ............................ 705/59
5,887,192 A * 3/1999 Nishio ............................... 710/7
6,993,508 B1 * 1/2006 Major et al. ..................... 705/51
7,099,479 B1 * 8/2006 Ishibashi et al. .............. 380/281
7,612,278 B2 * 11/2009 Sitrick et al. ..................... 84/609
8,108,936 B2 * 1/2012 Kawaguchi et al. ............ 726/27
2001/0023417 A1 * 9/2001 Stefik et al. ..................... 705/57
2002/0049679 A1 * 4/2002 Russell et al. .................. 705/52
2002/0075572 A1 * 6/2002 Boreczky et al. ............. 359/722

(Continued)

FOREIGN PATENT DOCUMENTS

EP 1 528 795 A1 5/2005
EP 1742441 A * 1/2007 .............. H04L 29/06

(Continued)

OTHER PUBLICATIONS

Extract from the Register of European Patents—EP1742441. Available from <http://eponline.org>.*

(Continued)

*Primary Examiner* — Calvin Cheung
(74) *Attorney, Agent, or Firm* — Robert D. Shedd; Paul P. Kiel

(57) ABSTRACT

The invention relates to a method for controlling digital rights of the "Play N times" type for a digital audio and/or video content, referred to as controlled content, the controlled content being consumed by a consumer on a consuming device or on another device delegating the controlling of these rights to the consuming device. According to this method, charging of one additional usage is inhibited in at least one of the following cases where:

the consumer momentarily consumes another content, on the same device where the controlled content is consumed, and then returns to the controlled content;

the consumer effects a pause in the usage of the controlled content;

the consumer performs a fast-forward of the controlled content;

or the consumer performs a rewind of the controlled content.

17 Claims, 7 Drawing Sheets

(56) References Cited

U.S. PATENT DOCUMENTS

| | | | |
|---|---|---|---|
| 2002/0130970 A1* | 9/2002 | Jiang | 348/459 |
| 2003/0069904 A1 | 4/2003 | Hsu et al. | |
| 2005/0138407 A1* | 6/2005 | Choudhary | 713/200 |
| 2006/0239273 A1* | 10/2006 | Buckman et al. | 370/395.41 |
| 2006/0242240 A1* | 10/2006 | Parker et al. | 709/205 |
| 2006/0242341 A1* | 10/2006 | Tsai et al. | 710/100 |
| 2008/0155057 A1* | 6/2008 | Khedouri et al. | 709/217 |

FOREIGN PATENT DOCUMENTS

| | | | |
|---|---|---|---|
| JP | 10042268 | | 2/1998 |
| JP | 2002207936 | | 7/2002 |
| JP | 2002207936 A | * | 7/2002 |
| JP | 2002281472 | | 9/2002 |
| JP | 2003018536 | | 1/2003 |
| JP | 2003333565 | | 11/2003 |
| KR | 1020040045893 | | 10/2004 |
| WO | WO03036962 | | 5/2003 |

OTHER PUBLICATIONS

Machine translation of JP-2002-207936 A; available from <http://www.ipdl.inpit.go.jp/homepg_e.ipdl>.*

Abstract of JP-2002-207936-A.*

Translation of Japanese Published Unexamined Patent Application (A) No. 14-207936, published Jul. 26, 2002; Application Filing No. 2001-5062, filed Jan. 12, 2001.*

"Call for proposals for content protection & cipy management technologies" DVB Digital Video Broadcasting, Jul. 5, 2001, pp. 1-23.

Search Report Dated Apr. 7, 2006.

* cited by examiner

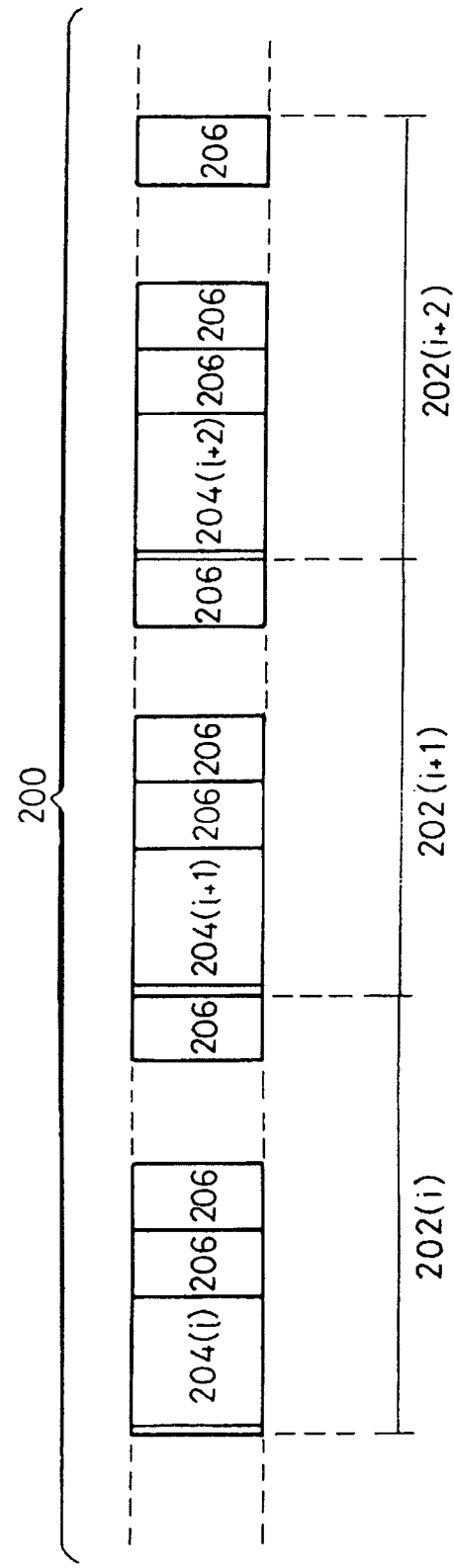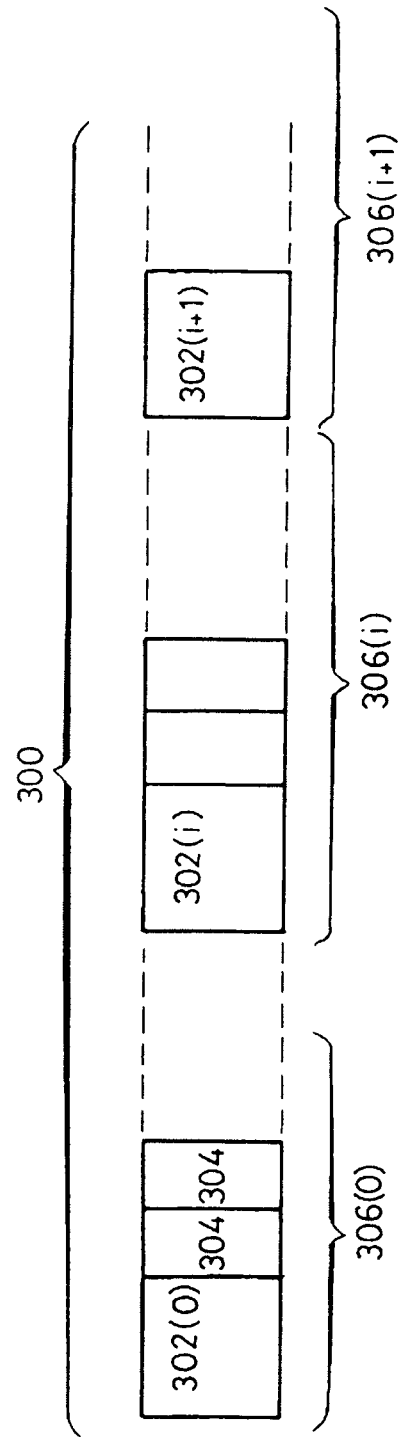

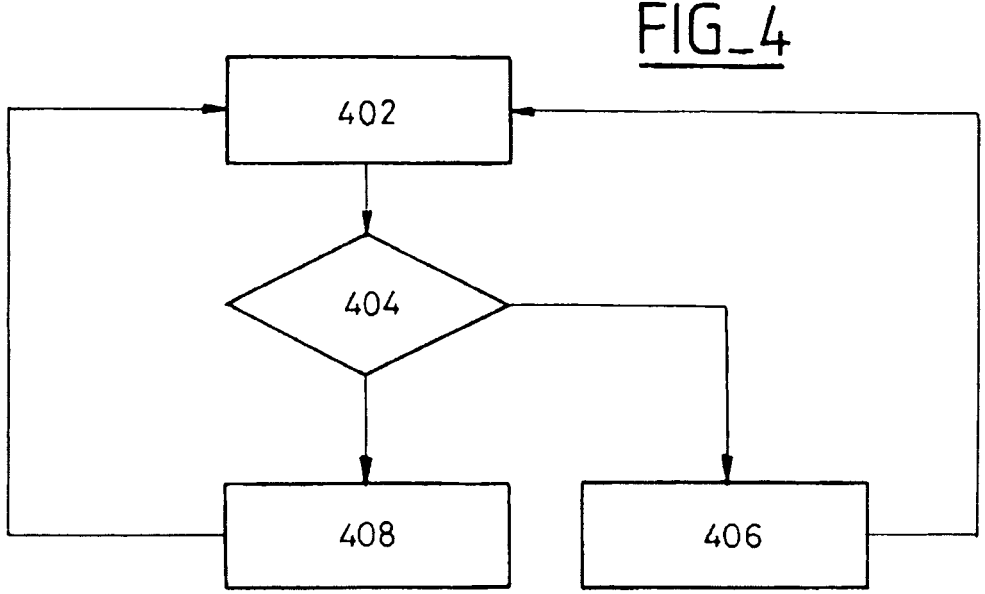
FIG_4
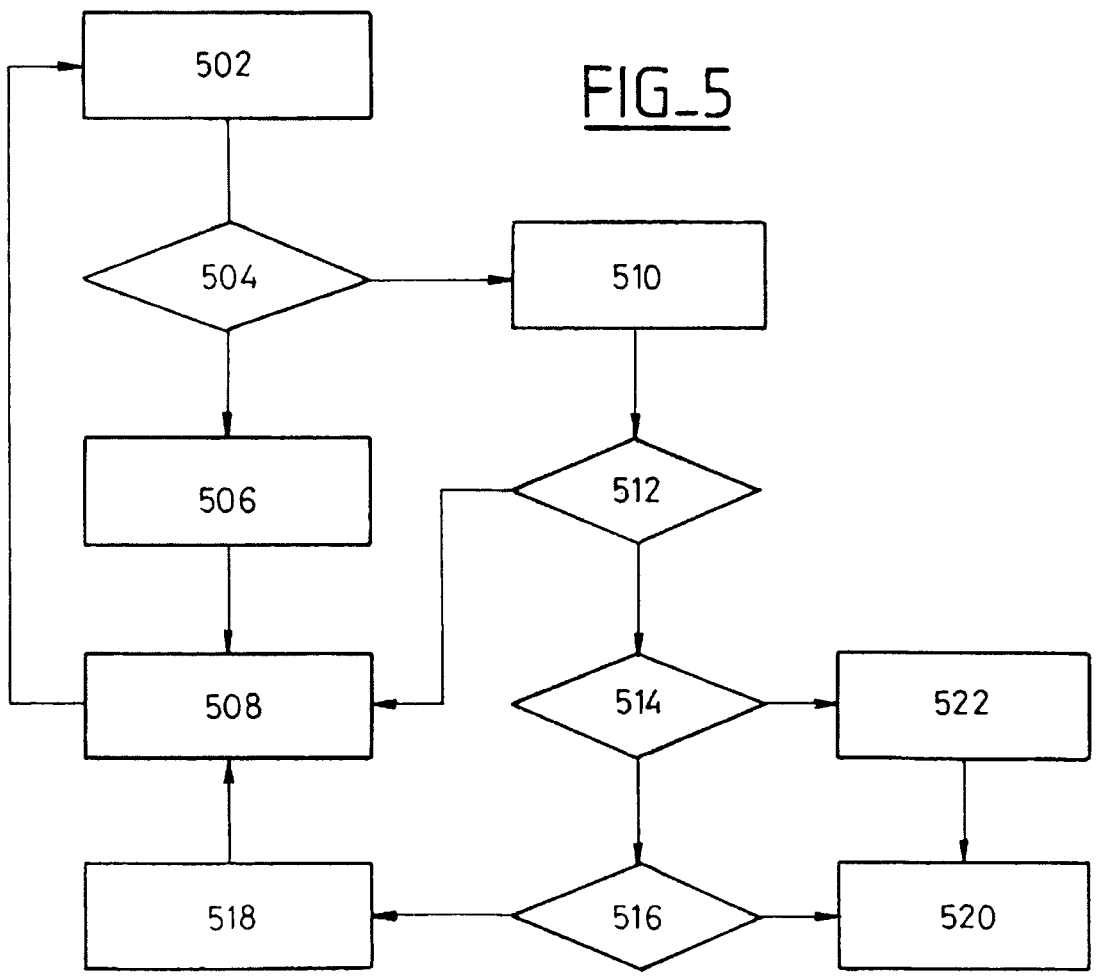
FIG_5

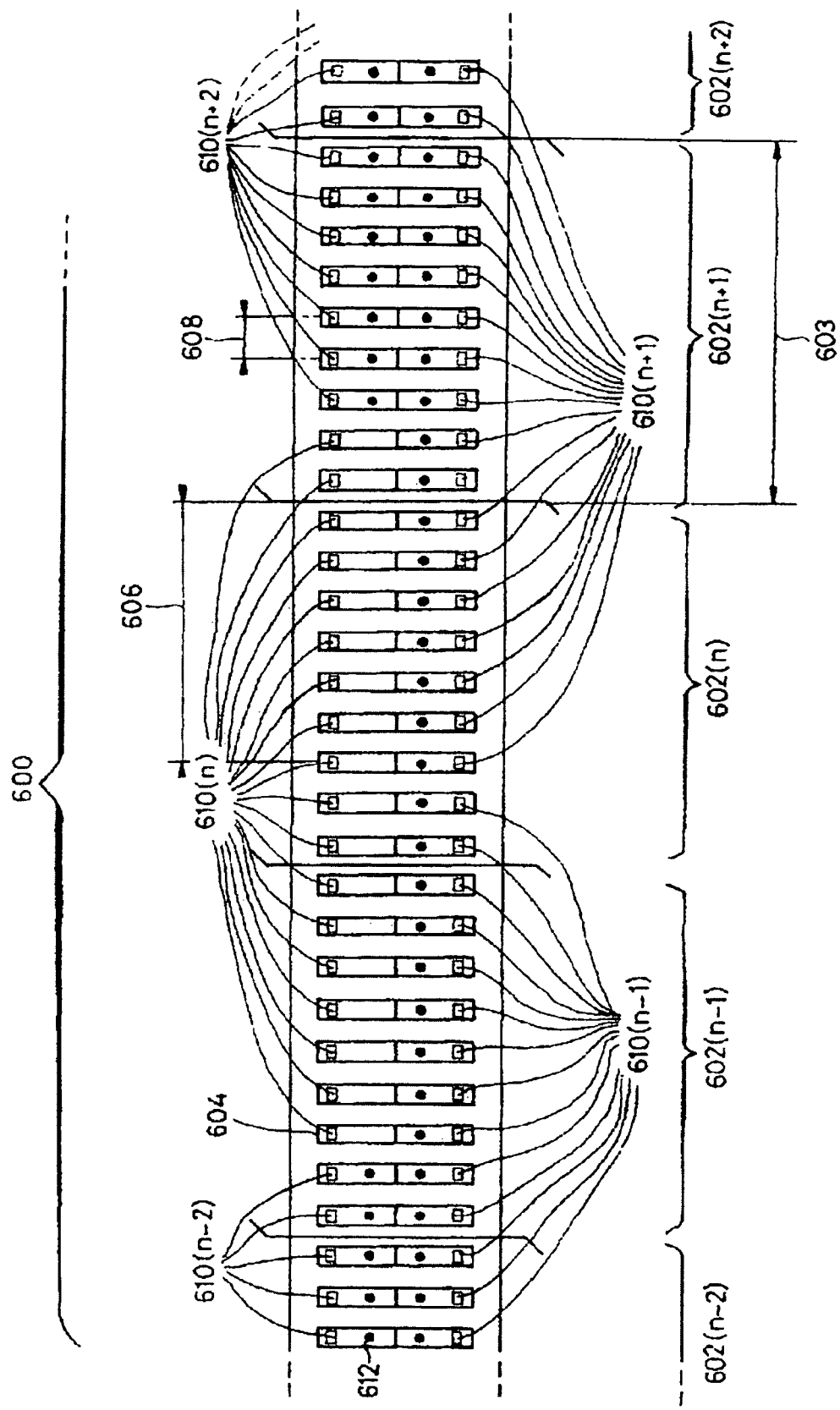
FIG_6

FIG_7
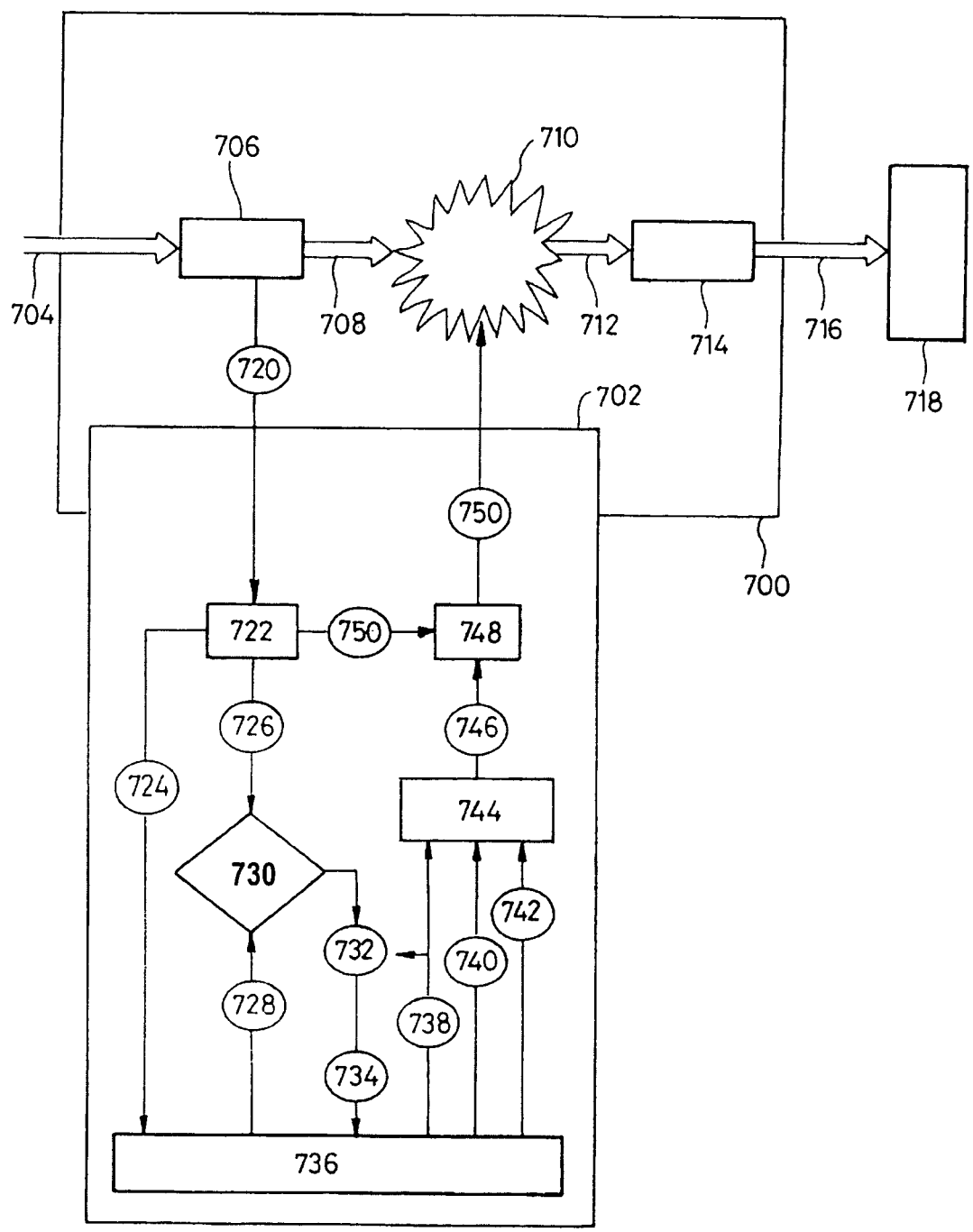

FIG_8
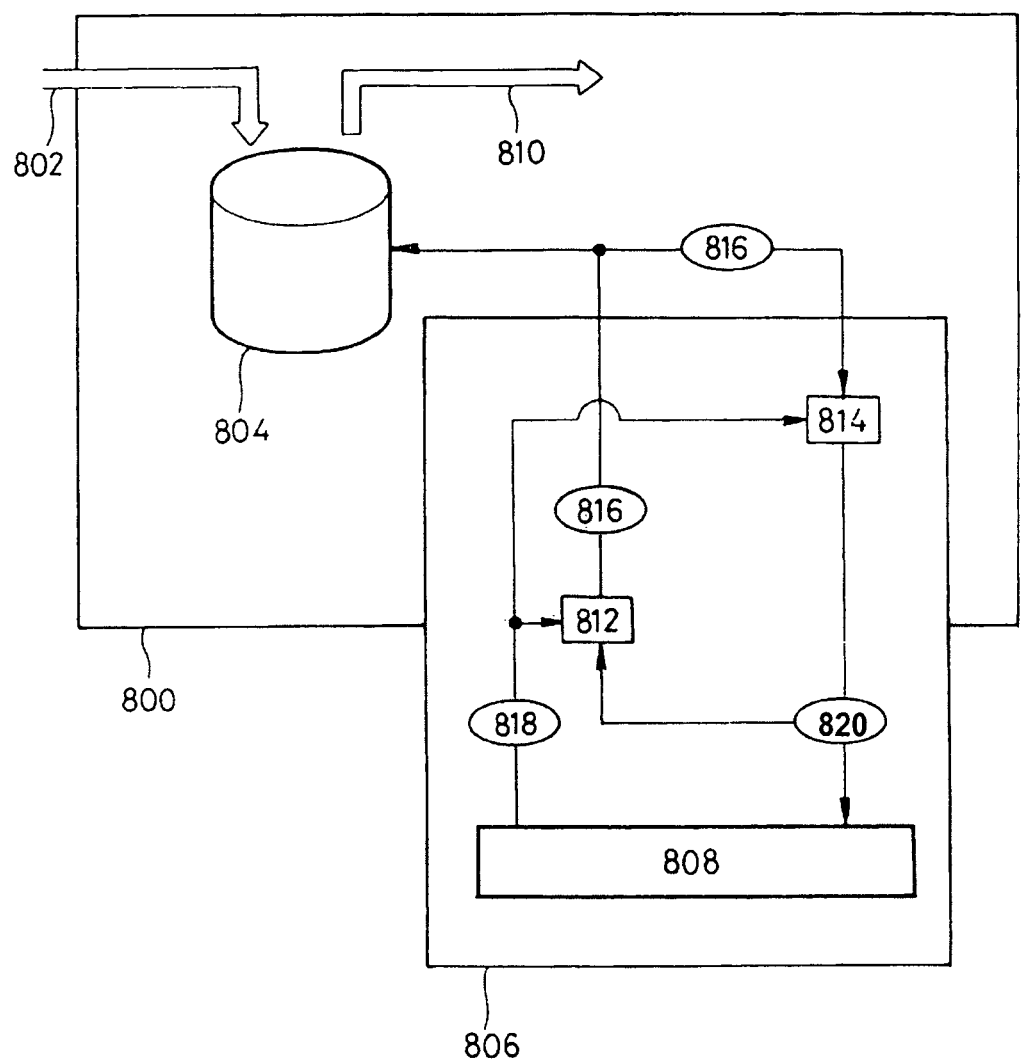

METHOD FOR CONTROLLING DIGITAL RIGHTS OF THE "PLAY N TIMES" TYPE FOR A DIGITAL AUDIO AND/OR VIDEO CONTENT AND DEVICE IMPLEMENTING THIS METHOD

BACKGROUND OF THE INVENTION

1. Field of the Invention

The present invention relates to a method for controlling the usage of digital rights, of the "Play N times" type, of a digital audio and/or video content and a device for implementing this method. In particular, it relates to control of the rendering, authorized for a fixed number of times, of audio content (for example music) and/or video content (for example films) on television receivers, computers, audio reproduction equipment, disc readers, portable personal systems, mobile telephones or electronic diaries.

2. Description of the Related Art

In order to control the usage of their products distributed by digital networks, such as the Internet, and to avoid pirating, producers of multimedia content (by way of non-limiting examples: films, documentaries, music, music videos, video games, audiovisual material, services or other content, etc.) implement digital rights management, henceforth referred to as DRM, methods associated with the content relinquished to their customers.

The rights associated with a content may, for example, allow usage of the content over a certain cumulative period of time (rights of the "Play N units of time" type) and/or a certain number of times (rights of the "Play N times" type). The monitoring of the rights relinquished to the customer must therefore be carried out progressively as the content is consumed by the customers.

The inventors have observed the possible behaviours of the consumer when consuming digital content in order to meet their technical expectations.

The invention, in fact, results from the observation that it is not currently possible to count N usages within a device for consuming content, referred to as consuming device or management device, in the framework of digital rights of the "Play N times" type, while at the same time taking into account:

the real normal expectations and behaviours of the customers when consuming content (in particular, "zapping", rewind, forward play and pause) and the requirement to ring-fence the N usages, in such a manner that the content may be consumed N times and only N times.

For example, when a content for which the customer has N permitted usages is consumed, the customer might wish, for a period of several seconds, to consume another product, an operation referred to as "zapping", to return to a slightly earlier point in the passage of the content, notably because something was missed, an operation referred to as rewind, or else perform a fast-forward operation.

In similar cases of zapping, of rewind, of forward play or of pause, the current accounting methods for the number of usages made by the customer count one additional usage to that in progress.

This is costly for the consumer and cannot be justified in every case.

SUMMARY OF INVENTION

The present invention therefore aims to solve the problem which consists in allowing the consuming device to keep account of the N permitted usages of a content, whose associated digital rights are of the "Play N times" type, while at the same time allowing, in accord with the expectations of the customers, a configurable capability for zapping and/or rewind and/or forward play and/or pause.

This usage can take place within the consuming device itself if it incorporates suitable means to do this and if it is desired by the consumer, but also within other consuming devices whose rights it manages.

For this reason, the invention relates to a method for controlling digital rights of the "Play N times" type for a digital audio and/or video content, referred to as controlled content, the controlled content being consumed by a consumer on a consuming device or on another device delegating the control of these rights to the consuming device, characterized in that charging of one additional usage is inhibited in at least one of the following cases where:

the consumer momentarily consumes another content on the same device where the controlled content is consumed and then returns to the controlled content, the consumer effects a pause in the play back of the controlled content, the consumer performs a fast-forward of the controlled content, the consumer performs a rewind of the controlled content.

Thanks to the invention, the customer can, during the play back of the controlled content, consume other content (zapping), and then return to the controlled content, without a new usage being charged.

Thanks to the process according to the invention, other functions may also be performed, notably forward play and pause functions.

According to one embodiment, the controlled content incorporates marker elements within at least certain parts of the controlled content.

In one embodiment, the charging of additional usages is inhibited if the consumer performs a rewind of the controlled content equivalent to a shorter usage period than a rewind threshold period.

Thanks to this invention, the customer can also return over a part of the controlled content up to the limit imposed by the additional usage threshold.

According to one embodiment, the rewind threshold period is a fixed percentage, associated with the consuming device, of the total duration of the controlled content.

In one embodiment, the rewind threshold period is associated with the controlled content and is independent of the consuming device. This threshold can then be contained within the licence associated with the controlled content.

According to one embodiment, the marker elements are position indicators; these indicators form a numerical series and are inserted in a periodic manner within the controlled content so as to form a series of indices throughout the controlled content, the smallest number of this series being inserted at the beginning of the controlled content.

Thus, the series is ordered and, in this embodiment, it is increasing. A variant to this embodiment may be envisaged where the series is decreasing.

In one embodiment, during the usage of a part of the controlled content comprising an index, processing means, associated with storage means and associated with the consuming device, sample this index present within this part of the content consumed, in order to compare it with the index previously sampled and stored, and:

if the latest index is greater than or equal to that stored, then there is no demand for a new usage, if the latest index is smaller than that stored, then the difference between the two indices is calculated:
if the difference is greater than the rewind threshold period then a demand for a new usage is made,
if the difference is not greater than the rewind threshold period, then there is no demand for a new usage.

Thus, zapping, pause and fast-forward operations do not trigger a demand for a new usage. Indeed, when the customer returns to the controlled content, the positioning indicator of the series associated with the content which is then processed is necessarily greater than or equal to the latest indicator of the series which was stored when the main content was left.

A rewind does not trigger a new usage demand if it is below the rewind threshold.

According to one embodiment, the indices are introduced in packets of control data regularly disposed throughout the controlled content.

In one embodiment, the processing means contain a database that associates with each controlled content, represented by an identifier for this content, at least one of the following data values:
the initial quantity of possible usages,
one or more encryption keys,
an updated number of usage(s) still possible,
the index of the latest packet of control data,
a maximum quantity of packets of control data on which a rewind can be carried out without triggering a new usage demand.

According to one embodiment, the controlled content comprises controllable parts divided into periods that each contain at least one packet of control data, called control message, this control message comprising a marker element, called mark; the process then comprises the steps, within the consuming device, consisting:
in progressively detecting each mark, within the controllable parts of the controlled content, as the controlled content is consumed, and
in tallying the number of these marks in order to be able to control the number of periods consumed from the controllable parts.

In general, in order to control the usage of the controlled content, data included in the data stream forming the controlled content are encoded (the coding being, in practice, a scrambling or encryption).

Advantageously, this invention is independent of the algorithm used for encrypting a content and can be implemented with a content encrypted by any kind of segmentation (for example by cryptoperiods).

In one embodiment, the controlled content also comprises uncontrollable parts.

Thus, certain parts of a content may be controlled in order to limit their usage, while at the same time allowing other parts of this same content to be freely consumed in an unlimited manner (for example, in the case of a film, the controllable part may be the film and the uncontrollable parts may be commercials or trailers for other films).

According to one embodiment, the mark is a token.

In one embodiment, the mark is the absence of a token.

According to one embodiment, within the consuming device, a database is formed that comprises, for each content controlled by the consuming device, a set of data values, called counting structure, each counting structure comprising an identifier for this content and a number, called TOV number, representing an allowed maximum number of marks able to be detected and tallied during one single play back of this controlled content.

In one embodiment, the number of marks detected and charged, for a current playback, is compared, for each new period consumed of the controllable part, with the TOV number, in such a manner that, if the number of marks detected and charged exceeds the TOV number, the playback in progress terminates and a demand for a new playback is made.

According to one embodiment, each counting structure contains a number, called usage margin, representing an additional maximum number of marks that can be detected and tallied with respect to the TOV number, in such a manner that, if the number of marks detected and tallied exceeds the sum of the TOV number and of the usage margin, the usage in progress terminates and a demand for a new playback is made.

Thanks to this invention, the digital rights contents supplier can offer the possibility (that can moreover be regulated by them by modifying certain parameters intrinsic to the invention, in particular the TOV number and usage margin) to pause, rewind back over a part of the content or advance using fast-forward within the context of a single usage of a content.

In one embodiment, each counting structure comprises a number of usages still possible for each digital content, called STP number.

According to one embodiment, the result of the demand for a new usage consists of:
either the prohibition of a new usage if the STP number is zero;
or, if the STP number is non-zero, the authorization for a new usage and hence the decrease of the STP number.

In one embodiment, secure storage and processing means participating in the controlling of the rights associated with the content are assigned to the consuming device.

According to one embodiment, the secure storage and processing means contain the database for the counting structures.

In one embodiment, the database for the counting structures is stored in an encrypted fashion within the storage means of the consuming device, the secure storage and processing means containing an encryption key allowing the counting structures of this database to be decrypted.

According to one embodiment, the controlled content, whose usage is controlled by the consuming device, is obtained by an adaptation of a content, called external content, when an external content is transferred to the consuming device, this adaptation allowing the consuming device to control the usage of the controlled content.

Thus, the invention advantageously allows a content to be separated from its licence when transferred into a consuming device.

In fact:
the transfer of the content into the consuming device (and hence the digital processing associated with this transfer) only needs to be done once,
If various licences are transferred for the usage of the same content and if the licences accord rights of the same kind, the same content transferred into and processed in the consuming device can be reused for each licence.

In one embodiment, when the external content is transformed into controlled content, packets of control data for the external content are converted into packets of control data for the controlled content, the marker elements being introduced into certain packets of control data for the controlled content during this transfer.

The invention also relates to a consuming device, characterized in that it implements the controlling method according to one of the aforementioned embodiments.

In one embodiment, the consuming device is a portable device.

Advantageously, this invention equally allows controlling of digital rights of the "Play N times" type for both fixed and portable consuming devices.

This invention also allows the usage to be controlled on the consuming device itself or on other devices whose usage is controlled by the consuming device, whether it be portable or fixed.

According to one embodiment, the consuming device is a personal multimedia player.

BRIEF DESCRIPTION OF THE DRAWINGS

Other features and advantages of the invention will become apparent from the description presented hereinafter by way of non-limiting example and which makes reference to the appended figures, in which:

FIG. 3a shows a possible structure of a data stream of a content,

FIG. 3b shows schematically a data stream structure of a controlled content,

FIG. 4 shows schematically creation and update steps of a database required for one embodiment of the invention, FIG. 5 shows schematically steps for controlling the access to the content in one embodiment of the invention, FIG. 6 shows schematically a data stream of a controlled content in one embodiment of the invention, FIG. 7 describes schematically one part of the architecture of a consuming device implementing one embodiment of the invention, FIG. 8 describes schematically the processing of a controlled content in one embodiment of the invention.

DETAILED DESCRIPTION OF THE PREFERRED EMBODIMENTS

The invention that relates to a method for digital rights management of the "Play N times" type is capable of multiple embodiments that will depend, notably, on the choice of consuming device and on the application of this device.

In other words, content may be consumed, or not:
on the consuming device itself depending on the technical means available to it,
or on other devices delegating, at least in part, the "Play N times" digital rights control functions to the consuming device (which may also not itself possess consuming means).

An exemplary embodiment is described in the following: the consuming device is portable and, more precisely, is a personal multimedia player. This personal player is comprised within an assembly of devices, belonging to the same customer, associated with the usage of digital content. This assembly of devices is referred to as the "client domain".

Figure 1:
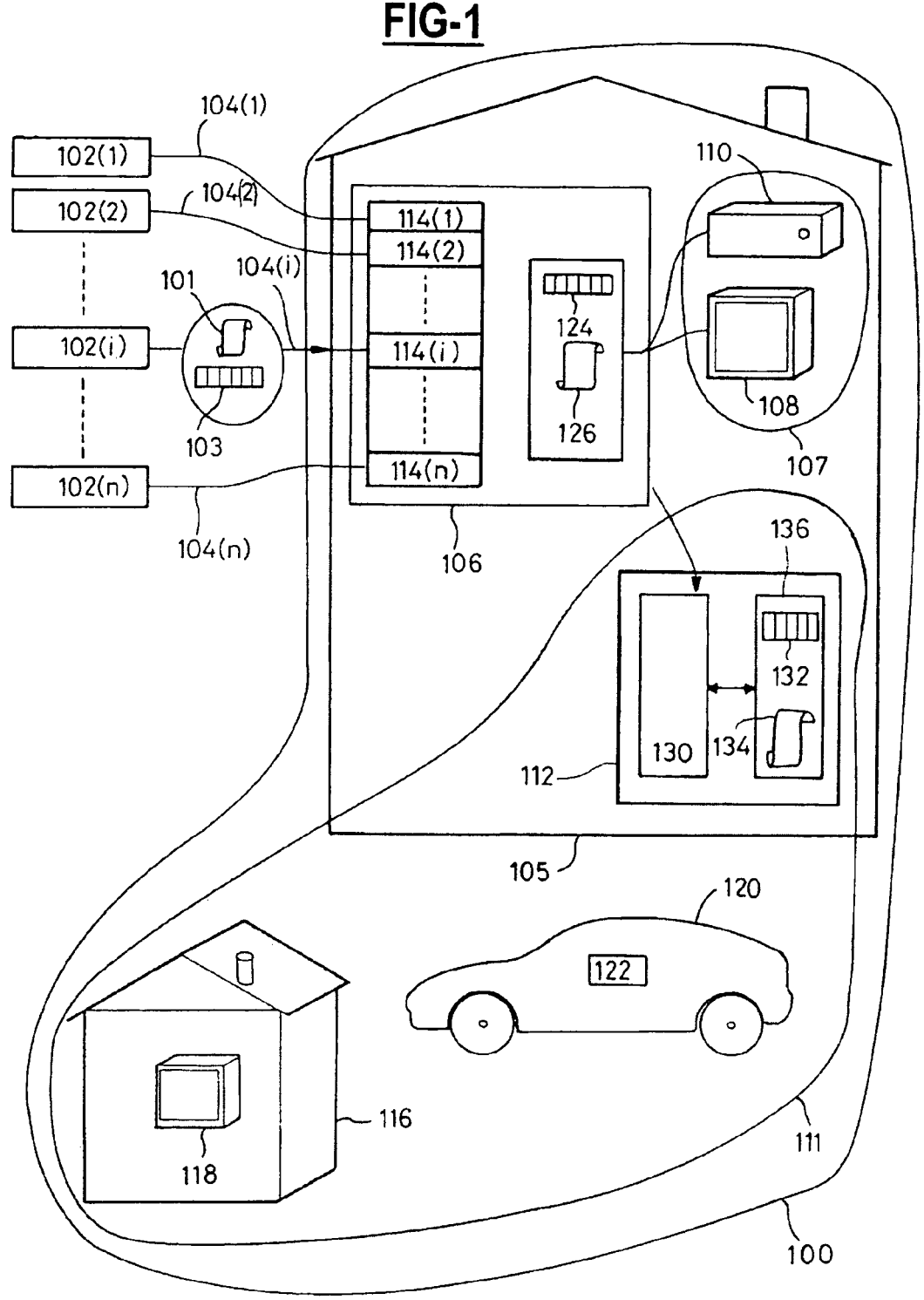
FIG. 1 shows schematically one embodiment of the invention.

Such a client domain 100 is shown schematically in FIG. 1: providers 102(i), 1<=i<=n, of video and/or audio content, supply a digital content 103, referred to as the provider content 103, and rights, referred to as provider rights, associated with the provider content 103 and comprised in a licence 101, referred to as provider licence 101.

When an order comes from a customer owner of the client domain 100 for a content 103 associated with the provider rights, the provision takes place via provider networks 104(i), 1<=i<=n, connected to an access device 106 (for example a computer linked to the Internet) of the client domain 100.

In order to provide this content, a DRM process is implemented in a DRM module 114(i) of the access device 106 between each provider 102(i) and the access device 106, which DRM process manages notably the access to the content from the providers and to their associated rights (the rights being incorporated into a provider licence 101) and the payments related to a remote point of sale.

In this embodiment, the digital content follows an audio/video standard allowing the conditional access for the provision of audio/video content: the DVB-MPEG2 (for "Digital Video Broadcasting Motion picture Expert Group") standard.

FIG. 3a shows schematically an exemplary structure of a content 200 in such a standard.

The audio and video content 200 is here formed by a series of periods, called cryptoperiods CP 202(i) or key lengths 202(i).

These cryptoperiods have a duration defined by the provider 102(i). This duration is generally 10 seconds. Each cryptoperiod CP 202(i) contains packets 206 of audio/video data, called AN packets 206, which are scrambled with a control word CW(i).

Each control word CW(i) of a cryptoperiod 202(i) is placed within a packet 204(i) of control data or control message, called DECM(i) (the acronym for "DRM Entitlement Control Message") packet 204(i), of this same cryptoperiod 202(i). This DECM(i) packet 204(i) can also contain other data, notably a content identifier, denoted CID, that is constant throughout the various cryptoperiods for the same content.

In this embodiment of this invention, the data contained in the DECM(i) packet 204(i) are encrypted by means of a symmetric key $K_{drm}$ specific to the DRM process managed by the access device 106. This encryption function is denoted $E_{Kdrm}$ (in variants of this invention, this DECM(i) encryption does not exist, or if it exists, it may be asymmetric). Then:

$$DECM(i)=\text{packet } 204(i)=\{E_{kdrm}(CID, CW(i), \dots)\}$$

In FIG. 3a, the content 200 is shown with only one DECM (i) packet per cryptoperiod 202(i) for reasons of simplification but, in practice, it may contain several DECM packets per cryptoperiod.

Once the provider content 103 and the provider licence 101 (FIG. 1) have been transferred to the access device 106 of the client domain 100, the resulting content 124 and the resulting licence 126 must be transferred to the personal player 112.

In order to consume the content on a personal player 112, two types of secure content and rights transfer process can be implemented:
a transfer process called master/secondary process, and/or
a transfer process called access/isolated process.

During a transfer towards the personal player 112 implementing a master/secondary process, when it connects to the access device 106 for acquiring a content, the personal player 112 receives the content and the rights that the customer wishes to use in the personal player 112, these rights being included within a licence, called secondary licence, associated with the content.

For this purpose, the personal player 112 implements a DRM process, called secondary or portable DRM process, unique to the personal player 112 and different from the master DRM processes which are implemented in the DRM modules 114(i) associated with each provider 102(i). The object of this secondary DRM process is to control access to the content in the personal player 112 and it has its own licence format. When the customer causes a content to transfer from his access device 106 towards the personal player 112, the master DRM process generates a secondary licence having a format compatible with the secondary DRM process.

Each master DRM process also manages the interfacing with the secondary DRM process.

The content present in the personal player 112 is then exclusively associated with the personal player 112. The loading of the content into the personal player 112 is a secure operation. The secondary licence is also secure.

The personal player 112 comprises:
 means 136 for storing content and means 130 for implementing a secondary DRM process, called secondary or portable DRM module 130,
 secure storage and processing means whose purpose is to store secret data, notably keys, and to perform cryptographical operations. In this embodiment, these means comprise a smart card. The DRM module 130 is preferably included in these secure storage and processing means.

The master DRM process of the access device 106 therefore creates a secondary licence where secondary rights (which are deducted from the primary rights and hence form a sub-set of them) are included, which rights are required for the usage of the content in the personal player 112. This secondary licence is transferred with the content into the personal player 112.

Subsequently, the master DRM process updates the master licence as a function of the rights transmitted to the personal player 112.

Then the content, together with the secondary licence, is transmitted in a secure manner from the access device 106 to the personal player 112.

Lastly, the customer consumes the content in the personal player 112. The secondary DRM process controls the access to the content present in the portable device and updates the secondary rights, according to the usage of the customer and the secondary licence or licences present in the personal player 112.

Another secure process for the transfer of content towards the personal player 112 called access/isolated process can be used, notably where it is not desired to limit the usage within the portable personal player 112 in order that this usage may take place either within the personal player 112 or within a device part of the client domain 100 managed by the personal player 112. The personal player 112 does not, in fact, necessarily contain consuming means (for example a display screen), it may solely contain means for storing content.

Rights protection processes have been developed to protect certain provider rights within certain parts of the domain 100, and to verify that the usage of a content takes place legitimately within these parts, in particular within the access device 106 and the part 107 of the domain 100 containing consuming devices 108, 110 which are connected to the access device 106 via continuous communications links (cable, Ethernet, wireless, etc.).

Examples of such processes for the protection of rights associated with content are notably described:
 in the document WO 00/62505 A1 entitled "Digital Home Network and method for creating and updating such a network"
 or in the document EP 1 253 762 A1 entitled "Process for managing a symmetric key in a communications network and devices for the implementation of this process" which defines a management process where the content is coded and decoded by means of a symmetric key notably known by the consuming devices 108, 110 of the network part 107.

In an access/isolated transfer process (FIG. 1), the content 103 and the licence 101 are transformed into a personalized content 124, and into a personalized licence 126, following a process described in the patents cited above.

A content 124 composed of coded video and audio packets is then obtained, where packets are incorporated in a regular manner that contain the information required for the usage of the content 124 within the consuming devices 108, 110 of the network part 107.

When the user wishes to consume a content on his personal player 112 or on isolated consuming devices 118, 122 of his domain, an adaptation of the personalized content 124 and of the personalized licence 126 is effected when this content is transferred from the access device 106 towards the personal player 112 where it is then stored in the form of an isolated content 132 and isolated licence 134.

For this purpose, the portable DRM module 130 of the personal player 112 is used.

It will be noted that the module 130 is generic, in other words that it does not depend on the provider of the content 102(i), and is secure, meaning that it is resistant to fraud, and stores encryption and usage clearance data.

At the end of the secure content transfer process, the storage means 136 of the personal player 112 contain:
 an isolated content 132, adapted for its controlled distribution from the isolated device 112, obtained from the digital content 124,
 and a licence 134, called isolated licence, obtained from the personalized licence 126 and containing the rights that the customer wishes to use from the isolated device 112 within the domain 100, notably in the isolated part 111, and the data required to permit this use.

An update of the rights remaining in the access device 106 is also performed by deducting the rights transmitted to the isolated device 112.

An exemplary embodiment of the invention is thus defined (notably, the consuming device is a personal player, which is comprised within a client domain and which consumes content in MPEG2 format, and the content is transferred to it by using one or other of the two transfer processes described hereinabove).

Two main embodiments (with variants) of the invention, varying as a function of the marker elements used, are described in the following: an embodiment implementing a series of markers or indices and an embodiment implementing tokens.

In the embodiment implementing a series of markers, the control process of the invention uses the master/secondary transfer process and, as a variant, the access/isolated process, as described hereinafter with reference, notably, to FIG. 2.

The portable DRM module 130 of the personal player 112 transforms a content 103 received by the access device 106 into a content 132 according to the following steps:
 $1^{st}$ step 150: the content 103, containing DECM packets 140 and the associated licence containing a packet 144 of data, denoted DEMM packet, is loaded into the storage means 136 of the personal system 112,
 $2^{nd}$ step 152: the DEMM packet 144 is sent to the DRM module 130 in order that this module 130 knows the associated rights,
 $3^{rd}$ step 154: the DECM packets 140 are transformed into packets 142 of control data PECM and a table 146 of control data, denoted PCD table, is created and stored in the personal system 112; the PCD table 146 is notably used for metering the number of usages consumed, 4th step 156: the content 103 is transformed into content 132, notably by incorporating the PECM packets 142 into it.

The PECM packets 142 and the PCD control table 146 contain all the information for controlling the usage of the content 132.

Next, certain steps required specifically for the control of rights of the "Play N times" type, namely:

1) the transformation of the content (from a content 103 to a content 132),
2) the creation of the PCD control tables 146, and
3) the control of the rights of the Play N times type are detailed within the framework of this embodiment of the invention.

The transformation of a content 103 into a content 132 occurs in the following manner:

When the personal player 112 receives a licence 101, if the content 103 associated with this licence is already stored in the storage means 136 but not yet transformed, then the personal system 112 requests from the DRM module 130 the transformation of the DECM packets 140 into PECM packets 142 by following the master/secondary process and, as a variant, the access/isolated process.

The PECM packets 142 contain, in addition to a content identifier, called CID identifier, and to a control word, denoted CW(i), used to descramble the data of the cryptoperiod (i), a series of numbers (k=0, 1, 2, ... L-1), called marker or index series, indexing the PECM packets 142 within the content 132.

These markers are used for detecting modes of usage of the content, notably rewind, forward play, pause and "zapping".

In this embodiment of the invention, the PECM packets 142 are encrypted using a symmetric key Kc. There are several possibilities for managing the key Kc:

First Option: Kc depends on the given portable device 112. In this case, all the content comprised in this portable device 112 is protected by the same key Kc.

Second option: Kc depends on a content. In this case, each content comprised in a portable device 112 uses a different key Kc.

In the case of the master/secondary process, the key Kc is encrypted by a key $K_{drm}$ which is the key of the master DRM and which is transported within the DEMM packet 144.

The result of the encryption of Kc by $K_{drm}$ is inserted into the PECM packet 142.

A PECM packet 142 can therefore be represented, in this embodiment, by:

$$E_{kc}(CID|CW|k)|E_{kdrm}(Kc)$$

where $E_K$ represents an encryption function using the key K and where | represents the data concatenation function.

Figure 2:
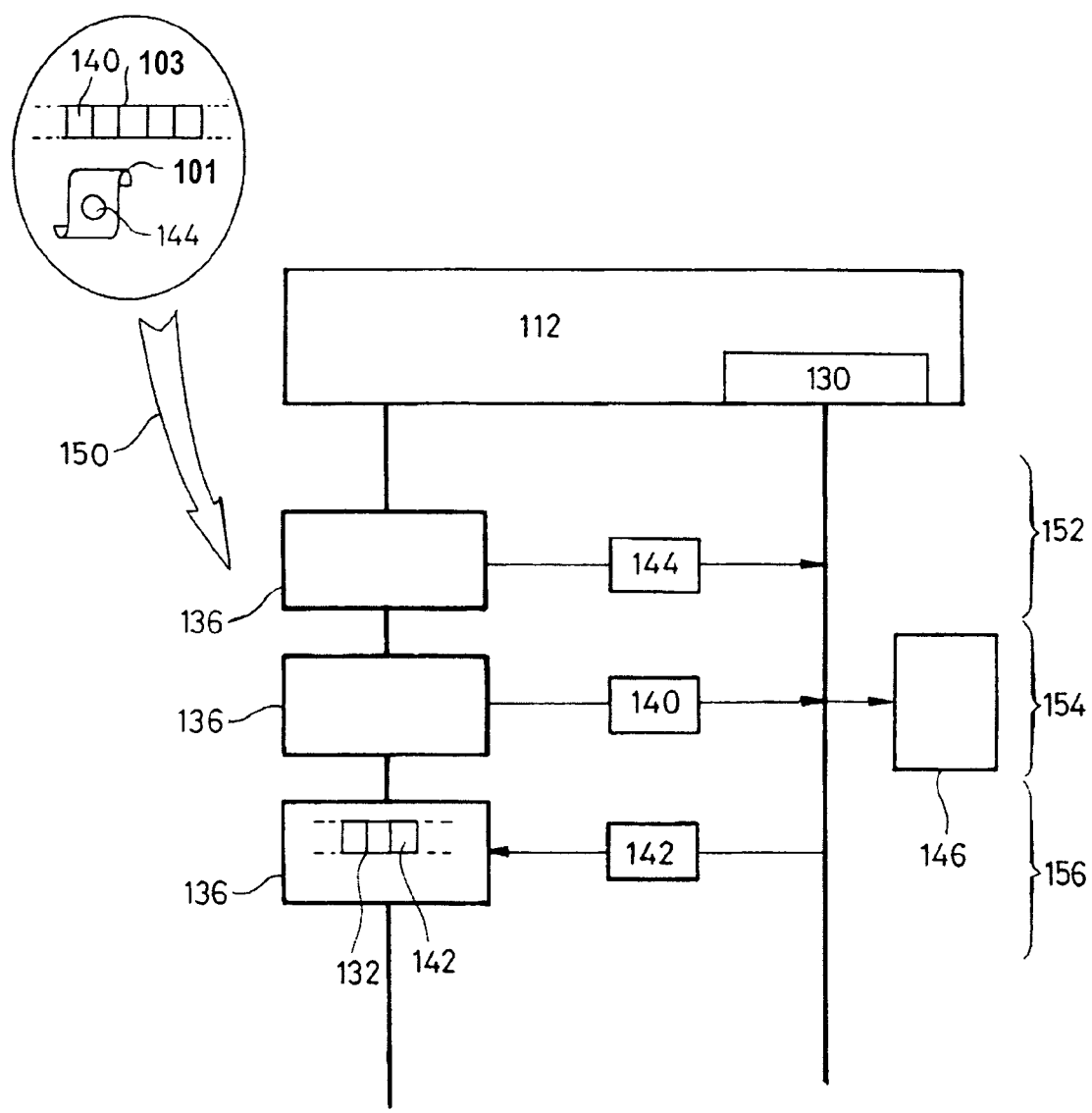
FIG. 2 shows schematically certain steps of one embodiment of the invention.

As shown in FIG. 2, the DRM module 130 of the personal system 112 creates PECM packets 142 upon receiving the DEMM packet 144 included within the licence 101 and DECM packets 140 included within the content 103.

The DEMM packet 144 contains, notably, the CID content identifier, the digital rights of the content (for example, the right to see a given film twice) and the key $K_{drm}$ used for protecting the DECM packets 140.

The DECM packets 140 have a format $E_{kdrm}$(CID, CW).

In order to convert a content, the portable DRM module 130 resets the index k to 0 and extracts the encryption key Kdrm from the DEMM packet 144.

If the key Kc depends on the content, then the DRM portable module 130 randomly generates a key Kc. Then the DRM portable module 130 DRM carries out the following actions for each DECM data packet 140:

Decryption of the DECM data packet 140 using the key $K_{drm}$ and extraction of the control word CW,
Addition of the index k,
Creation of the PECM data packet 214, and
Incrementation of the index.

FIG. 3b shows schematically the format of the content 300 obtained after the conversion step. The controlled content 132 in FIGS. 1 and 2, denoted content 300 in this figure, is composed of cryptoperiods 306(i). Each cryptoperiod 306(i) comprises a PECM packet 302(i) comprising a marker or index k and A/V packets 304 containing coded audio and video information. It will be noted that, even though only one PECM packet 302(i) is shown per cryptoperiod 306(i) in FIG. 3b, in practice, several packets PECM(k) may be included in the same cryptoperiod, each packet PECM(k) containing an index k that is unique to it and which is, in this example, greater than the index k-1 of the preceding PECM packet within the stream of data forming the content 300.

The portable DRM module 130 manages the PCD control data table, each entry of which, denoted PCD[CID], corresponds to a content in the portable device.

The PCD usage control table contains the following information for each managed content:

A CID content identifier,
A usage rule ("consume N times"),
A key Kdrm of the master DRM: this key Kdrm is received within the DEMM data packet 210,
An updated number of usages still possible, denoted pn. This number is reset to N for usage rights of the "consume N times" type. Each time the content is consumed, pn is decremented,
An index or marker, denoted kPCD, of the latest data packet 302(i) PECM(k) consumed,
A maximum number, denoted M, of data packets PECM(k) that may be replayed in rewind. The number M may be fixed or transmitted within the DEMM data packet.

In summary, each entry of the PCD usage control table associated with a content is represented by:

$$PCD[CID]=CID|rule|Kdrm|pn|k_{PCD}|M.$$

FIG. 4 shows schematically the steps leading to the creation of an entry associated with a content of the PCD table, denoted PCD[CID].

When the portable DRM module 130 receives a DEMM packet associated with a content in a step 402, it verifies, in a step 404, whether the entry PCD[CID] already exists for this content with the CID identifier in the PCD table:

if the entry PCD[CID] does not exist in the PCD table, then, in a new step 406, a new entry PCD[CID] is created, in which pn and the index kPCD are reset to N and 0, respectively. If the value of M is contained in the data packet DEMM, M is reset to this value. Otherwise, M is fixed at its default value.

if the entry PCD[CID] already exists in the PCD table, then, in a new step 408, it is updated by increasing the updated number of usages still possible pn by the value of N.

When the user consumes the content (for example a film) having a CID on his personal player, the portable DRM module of the personal system looks for the entry PCD[CID] in the PCD table. If this entry PCD[CID] is not found (which means that the film licence is not available), usage is refused. Otherwise, the control of the access to the content is effected as shown schematically in FIG. 5.

In a first step 502, the DRM module of the personal system receives a data packet PECM(k) with an index k. Then, in step 504, it compares k with the index kPCD included in the entry PCD[CID]:

If k≥$k_{PCD}$ (which corresponds to a usage of the content in its normal direction), then kPCD is updated with the value k during step 506. The data packet PECM(k) is decrypted in step 508 and the film can be viewed on the personal system.

Otherwise (for a rewind operation), the DRM module 130 calculates the value ($k_{PCD}$-k), denoted bpn (for "rewinded number"), in step 510. Then, in step 512, the value of bpn is compared with M. Then, there are two possible cases:

If bpn is smaller than M, then the data packet PECM(k) is decrypted and the corresponding content can be consumed. In this case, kPCD is not updated, If bpn is larger than M, it is then considered that there is a demand for a new usage (which will be possible or not depending on the remaining rights). The personal player and notably the DRM module warn the user.

In a step 514, it is verified whether pn is zero. If pn is not zero, the personal player asks the user to confirm that they wish to consume the content one more time during step 516. If the user confirms this, the number of usages still possible pn is decremented and $k_{PCD}$ is reset to 0 (step 518). The data packet PECM(k) is then decrypted and the content can be consumed (return to step 508). If the user refuses, then the data packet PECM(k) is not decrypted and $k_{PCD}$ is not updated (step 520). Then, the user can reposition his content further forward and continue his usage in progress. If pn is equal to 0, the user is informed (step 522) before terminating the usage of the content (step 520); the DRM module of the personal player can then propose to the user to acquire a new licence.

As a variant, it will be noted that, instead of using a precise number M of data packets PECM(k) that can be replayed in reverse without counting an additional usage, a certain percentage of the total length of the content may be used.

An entry PCD[CID] of the PCD table is erased when the user erases the CID identifier of the content of the personal player.

A variant of this process for erasing the entries PCD[CID] is to perform batch erase operations: this can be effected in a periodic fashion (for example each day) or else when it becomes necessary, for example when there is no more memory available.

The DRM module of the personal player is the ideal place for storing the PCD table. If its resources are limited, an alternative solution is to store a part (the key $K_{drm}$ must not then be in this part) of the PCD table outside of the DRM module of the personal player. However, the integrity of the PCD table must be guaranteed.

For example, a signature of the PCD table must then be stored in the portable DRM module. In this case, before using the PCD table, its integrity must be verified. After having updated the PCD table, the signature must also be updated. The signature can be produced by a simple hash function.

The DRM module of the portable device can be formed by using:

a smart card, such as for example a SIM card (acronym for "Subscriber Identity Module"), used for mobile telephones, or an onboard secure processor or a standard processor using software with anti-fraud protection.

The key Kc can vary depending on the content and can be encrypted (with the key Kdrm) by using the AES standard (acronym for Advanced Encryption Standard), as can the part with the packets PECM(k) which is encrypted with the key Kc.

In one exemplary embodiment of the invention, M has a default value of 10800. This corresponds to 30 minutes of rewind for video content having one packet PECM(k) every 10 seconds. This default value is only used when the licence of the consuming device does not contain any value for M.

Another possible embodiment of this invention implements tokens or the absence of tokens in certain parts of the digital stream forming the controlled content.

The implementation of this embodiment of the invention assumes the existence of a content containing marks, and more precisely tokens, that may be charged.

The first general step of this embodiment of the invention is the creation of a content containing these tokens.

The marks can be linked to the presence or to the absence of digital data, called tokens.

In one embodiment, a token can be a Boolean variable contained in the digital stream of the content, which is equal to 1, for example, if the token is taken as being present, or equal to zero if the token is taken as being absent.

The content, in other words the stream of data carrying the audio/video information that is consumed by the user, is divided into regular divisions, called cryptoperiods CP(i) or key lengths.

Each cryptoperiod comprises coded packets of audio and/or video information, called A/V packets, together with control messages mixed with the A/V packets.

The control messages contain the control words, denoted CW, allowing the A/V packets of one part of the content to be decoded.

For reasons of security, the control messages are in part non-encrypted and in part encrypted. A sub-part of the non-encrypted part of the control messages is however made secure thanks to a signature. This signature is itself included within the control messages.

The control messages also contain a content identifier, denoted CID. The value of the CID identifier is the same for all the control messages of the same content and only varies from one content to another.

In addition, the content is accompanied by the content licence. The content licence contains the rules for usage of the content. The information contained in this licence is also protected. This licence may be included within the control messages or else be separate from the content.

The content licence notably contains the following values:

the number of usages of the content still possible, denoted STP number (for "Still To Play"), the number of tokens equivalent to the complete usage of a content, denoted TOV number (for "Tokens for One Viewing")

the counter for tokens already used during the usage in progress, denoted TAU (for "Tokens Already Used") and optionally, the margin accorded to the consumer with respect to the TOV number for one usage to be considered as being used, this margin being denoted TM (for "Token Margin").

When the content is transferred into the consuming device, one token is added to each control message in order to form modified control messages.

It is possible for tokens not to be added to one portion of the content. This allows only certain parts of the content to be controlled while, at the same time, leaving complete freedom for usage of other parts. This functionality is called "complementary functionality".

One variant of this embodiment of the invention, called "implicit token variant", is to consider by default that all the control messages contain a token. In that case, the control messages do not, in fact, contain additional information related to the tokens.

In this variant, the control message is only modified in the case where the complementary functionality is used: in this case, the control messages of the uncontrollable part of the content contain additional information indicating that they do not contain tokens.

The token is associated with a cryptoperiod CP(i). So, in the modified control message, this token is associated with a control word CW. If there is more than one CW within the modified control message, also denoted ECM packets, then only the control words CW that need a counting functionality have an associated token.

If a token must be associated with a cryptoperiod, then all the ECM packets or licences carrying the control word CW for this cryptoperiod must include a token, since it cannot actually be determined which ECM packet or licence will be chosen at the time of decoding (or descrambling) of the content.

In the implicit token variant, also called "inverse token variant", by contrast with the real token variant, then all the ECM packets carrying the control word CW for the un-markered cryptoperiod (in other words with no token) must contain the message "not to be tallied".

FIG. 6 shows schematically a data stream of a content 600 that has, in part, been markered with real tokens (the real tokens being more "graphic" than the implicit tokens).

The stream is divided into cryptoperiods 602($i$), each having a period 603, for example of 10s duration, and FIG. 6 shows the periods 602($n-2$), 602($n-1$), 602($n$), 602($n+1$) and 602($n+2$).

Each period 602($i$) contains several ECM packets 604. The time 608 between two ECM packets is, for example, 100 ms.

The control word CW(i) 610($i$) allowing one period to be decoded 602($i$) is present:
  within certain ECM packets 604 before the period 602($i$) (during a time 606, called "ECM advance" of the period 602($i-1$)), which allows the decoding means to be prepared before the arrival of the period 602($i$),
  within all the ECM packets of the period 602($i$) and
  within a few packets of the period 602($i+1$).

Thus, each ECM packet 604 contains two control words CW 610: CW(i) 610($i$) and (CW(i–1) 610($i-1$) or CW(i+1) 610($i+1$)).

As explained hereinafter, the positioning of the marks throughout the content, an operation referred to as markering, is carried out by associating a token 612 with the control word CW(i) 610($i$) if the period 602($i$) must be markered and by not associating a marker 612 with the control word CW(i) 610($i$) if the period 602($i$) must not be markered.

In FIG. 6, the period 602($n$) is not markered.

In this representation, the control messages are ECM packets 604.

Another part of this embodiment of the invention is the storage of a content, of the licence for this content and of counting structures associated with the tokens of this content.

The content is stored in a coded fashion on the consuming device, with its associated licence.

The consuming device comprises secure storage and processing means, called "secure storage means", which can incorporate:
  a smart card (such as for example a SIM card used for mobile telephones) or
  an on-board secure processor, or a standard processor using anti-fraud protected software.

These secure storage means keep the CID identifier in their memory and the licence information for each content available on the consuming device.

These storage means also contain a database comprising, for each available content, a set of counting data, denoted RCS (the abbreviation for Read Counting Structure). This RCS structure links the CID content identifier with the STP, TOV, TAU numbers of this content. Optionally, this entry also contains the TM margin associated with this content.

An RCS structure is therefore associated with each content:

$$RCS(\text{content } j) = \{CIDj, STPj, TOVj, TMj, TAUj\}.$$

The secure storage means will contain as many RCS structures as types of content available on the consuming device.

The storage capacity of the RCS structures may be limited or not.

Since the storage capacity of the secure storage means is generally low, in the case where the RCS structures are stored there, then the database of RCS structures (hereinafter referred to as "RCS database") is generally limited.

In this case, several variants are possible if the capacity limit of the secure storage means is reached:
  In a first variant, the addition of new content can be disallowed. Then, if the user wishes to add a new content to his consuming device, he must firstly remove content previously saved in his consuming device.
  In a second variant, one or more old lots of content are automatically erased from the memory of the consuming device when the user wishes to add a new content to his consuming device. This automatic erasing occurs on the basis of criteria on the content, which criteria may for example be the longest time elapsed since the last use or the longest storage time in the consuming device.

If these RCS structures are stored within the main memory of the personal player (which can be a hard disk), since the size of the RCS database is very small with respect to the capacity of this type of memory, the RCS database is not limited.

In the case where the RCS database is stored in the main memory of the personal player, then this database must be encrypted, so as to avoid a user of the personal player being able to modify it. In this case, the encryption key used to perform the encryption is stored in the secure storage means.

In order that the content be consumed on the consuming device, it must first be decoded using the decryption keys, also called "control words" CW, included in the control messages.

During this decoding operation, if the consuming device justifies its right to consume the content, the consuming device sends the control messages from the content to the secure storage means.

These secure storage means then extract the information required for the decryption (notably the decryption keys or control words) in order to make them available to the consuming device.

With regard to this invention, the justification of the right of the consuming device to consume the content comprises the step that consists in verifying that the STP number is greater than 0.

For this purpose, the secure storage means read the CID identifier in the control messages, then access the RCS structure corresponding to this CID identifier in order to obtain the STP number. If the STP number is greater than zero, the secure storage means permit the usage of the content. In the opposite case, they block the usage of this content.

If another usage is permitted, the secure storage means increase the used token counter TAU each time that decryption keys (control words CW) containing markers or tokens are extracted.

This token counting is independent of the mode of usage of the content (forward play or rewind, at normal speed, at high speed or slowed down).

Thus, for example, if the user uses rewind abusively, or if he consumes the same sequence of the content too many times, he may end up consuming all his usage credits. Then, his usage of the content is blocked, even if he might not have reached the end of this content.

For this reason, in one embodiment, the value of the TOV number of tokens is greater than the number of tokens contained by the content (from 50% to 100% greater).

Thus, even though there is still a risk of the user not reaching the end of the content before running out of his rights, in practice this should cover the majority of cases.

It may be noted that the token counter TAU is only incremented when a new ECM packet is consumed: which means that if the same cryptoperiod is consumed incessantly without passing to a new cryptoperiod, the TAV counter is incremented only the first time that the cryptoperiod is consumed but is not incremented for successive usages.

In addition to monitoring the STP number, the secure storage means continually verify the value of the token counter TAU, notably each time that the secure storage means extract decryption keys.

If the token counter TAU becomes greater than the TOV number of tokens equivalent to the complete usage of a content or, in one variant, greater than the sum of the TOV number of tokens and the token margin TM, then:
 the number STP of usages still possible is decremented by 1 and
 the token counter TAU is reset to zero within the RCS counting structure in the database of the RCS.

One variant of this process consists in only modifying the counter TAU while the STP and TOV numbers and the TM margin remain constant: each time a decryption key (or control word) is processed in order to be consumed, then the token counter TAU is incremented. The secure storage means continually verify the value of the token counter TAU and if the token counter TAU becomes greater than the product of the STP number and the TOV number (or in one variant, greater than the product of the STP number and the sum of the TOV number and the TM margin), then the control device blocks the usage of the content.

This embodiment of the invention that relates to a process for controlling digital rights of the "Play N times" type using tokens, is capable of multiple variants which depend, notably, on the choice of a consuming device and on the application of this consuming device.

This embodiment of the invention may be implemented by a portable consuming device, for example a personal multimedia system, included in the client domain such as described in FIG. 1.

In this embodiment, the personal player comprises a secure smart card.

The access device is a desktop computer equipped with one or more DRM software applications, which allow it to implement one or more DRM processes.

The content consumed in this personal player are in the MPEG2 standard format.

In this embodiment, a customer may consume a digital content 103 (FIG. 1) on his client domain 100 such as previously described.

Processes for the protection of rights have been developed in order to protect certain provider rights in certain parts of the domain 100, and to control the legitimate use of a content in those parts as has been described hereinabove in the description.

In this embodiment for controlling the usage by means of tokens, the control messages are the DECM packets which are inserted into the audio/video content as illustrated notably in FIG. 3a. When the content is transferred into the personal player, the DECM packets are transformed into packets of control data unique to the controlled content, denoted PECM packets as previously described, either including a token or not (depending on the option chosen—with tokens or implicit tokens).

When the content is transferred into the personal player, the secure smart card creates a new entry in its RCS database, storing in this entry the values of the STP number of usages still possible, of the TOV number of tokens permitted for one usage and, optionally, of the TM margin of supplementary tokens, these values being received in the licence accompanying the content.

The process for counting the tokens is schematically described in FIG. 7.

The stream 704 of data for a content already previously transferred to a personal player (which is therefore a controlled content) is transmitted to a decoder 700 comprised in this personal system.

Demultiplexing means 706 extract PECM packets 720 from the stream 704 of data and send the resulting stream 708 to decryption means 710.

The smart card 702 decrypts the PECM packet 720 (if permitted) using processing means 722 so as to obtain, notably:
 the control word CW 750,
 the content identifier CID 724, and
 the usage conditions 726 (e.g. "view N times").

The content identifier CID 724 is sent to a secure memory 736 of the smart card where the entries of the RCS database are stored.

Thus, the following are extracted from the secure memory 736:
 the number 738 of tokens consumed TAU associated with the content whose identifier is the identifier 724,
 the number 740 of tokens permitted TOV for one usage associated with the content whose identifier is the identifier 724,
 the number 742 of usages still possible STP associated with the content whose identifier is the identifier 724,
 the digital rights 728 associated with the content whose identifier is the identifier 724. These rights 728 are then compared with the usage conditions 726 in comparison means 730: if this comparison allows the usage of the cryptoperiod in progress to be permitted, then a message is sent to the token counter 732 that supplies the updated number 734 of tokens consumed TAU, in other words the number 738 of tokens consumed TAU supplied by the secure memory 736 incremented by one, this updated number 734 of tokens consumed TAU then being saved in the RCS database comprised in the memory 736.

Means 744 for controlling the smart card 702 then verify the numbers 738 TAU, 740 TOV and 742 STP, so as to send an authorisation 746 to means 748 for extracting the control word, if the verification is positive.

If the verification is negative, then the usage is blocked since the smart card does not send the control word 750 required to decrypt the content to the decoder 700.

With this authorization 746, selection means 748 send the control word 750, previously received from the processing means 722, to the decryption means 710.

These decryption means 710 decrypt the input encrypted stream 708 by means of the control word 750 in order to output a stream 712 which is sent to decoding and consuming means 714.

Finally, the resulting new data stream 716 is sent to means 718 for reproducing digital data (notably, display screens, loudspeakers, headphones, odour generators).

The secure smart card contains a protected memory. This memory can accommodate all the counting structures or RCS database entries if their number is very limited.

In the majority of cases, however, this number is larger than the capacity of the smart card memory. For this reason, it is preferable to store the token counting data structures in a database which is comprised in the main memory of the multimedia personal player. In this embodiment, this main memory is in fact a hard disk.

FIG. 8 describes schematically the storage and the extraction of the token counting data structures in the case where these structures are stored on a hard disk 804 of a multimedia personal player 800.

All the elements of this database are encrypted before being stored on the hard disk 804.

In fact, the database comprised in the hard disk 804 is a database of encrypted values.

A key 818 for the encryption and decryption of the elements comprised in the database, denoted Kcs key 818, is stored in the protected memory 808 of the secure smart card 806 comprised in the personal player 800.

The hard disk 804 is also used to store encrypted content data streams 802. Streams 810 output from the hard disk 804 are then sent towards the decryption means then towards reproduction means.

Each RCS counting data structure, such as was previously defined, is encrypted before being stored on the hard disk 804 in its encrypted form RCSE:

$RCS_E = E_{KCS}(RCS)$, where E is an encryption function using the Kcs key 818.

In this embodiment, the standardized encryption function AES (abbreviation of "Advanced Encryption Standard" defined by the US National Institute of Standards and Technology) is chosen as the encryption function.

$RCS_E = AES_{KCS}(RCS)$, where Kcs is a secret AES 128-bit key.

This encryption using the AES function is carried out in AES encryption means 812.

Each encrypted RCSE structure 816 is stored on the hard disk. In order to extract the data from the $RCS_E$ counting structure database efficiently, an uncoded index and the uncoded CID identifier are attached to each $RCS_E$ on the hard disk 804.

When the secure smart card 806 reads the database of the encrypted counting data structures 816 in order to take data from it, this card 806 searches for a structure 816 on the hard disk having the same CID content identifier as the content that it wants to process. Once the card 806 has found this structure 816, it reads it and decrypts it according to the formula:

$RCS = AES^{-1}_{KCS}(RCS_E)$ in the AES decryption means 814.

The extracted RCS data structure 820 is used to keep a tally of the number of times that one part of the content has been consumed.

This invention is capable of multiple variants. Thus, the invention may be implemented in multiple portable devices aside from personal entertainment systems, notably in mobile telephones or electronic diaries (PDAs).

What is claimed is:

1. A method for controlling digital rights of a controlled content, the method comprising:

tracking usage of the controlled content on a consuming device or on a second device, the second device delegating the digital rights to the consuming device, the controlled content being configured, through the digital rights associated with the controlled content, for usage of at most N times;

inhibiting charging as an additional usage of the controlled content in at least one of the following cases where:

a consumer momentarily consumes a second controlled content on a device, where the controlled content is consumed, chosen among the consuming device or the second device and then returns to the controlled content, the consumer effects a pause in a playback of the controlled content, the consumer performs a fast-forward of the controlled content, the consumer performs a rewind of the controlled content, and wherein the controlled content incorporates marker elements within at least certain parts of the controlled content, and the controlled content comprises controllable parts divided into periods that each contain at least one packet of control data, called control message, this control message -comprising a marker element, called mark, the method then comprises the steps, within the consuming device:

progressively detecting each mark, within the controllable parts of the controlled content, as the controlled content is consumed, and tallying the number of these marks in order to be able to control the number of periods consumed from the controllable parts.

2. The method according to claim 1, wherein the charging of additional usages is inhibited when the consumer performs a rewind of the controlled content equivalent to a shorter usage period than a rewind threshold period.

3. The method according to claim 2, wherein the rewind threshold period is a fixed percentage, associated with the consuming device, of the total duration of the controlled content.

4. The method according to claim 2, wherein the rewind threshold period is associated with the controlled content and is independent of the consuming device.

5. The method according to claim 2, wherein the marker elements are position indicators; the position indicators form a numerical series and are inserted in a periodic manner within the controlled content so as to form a series of indices throughout the controlled content, the smallest number of this series being inserted at the beginning of the controlled content.

6. The method according to claim 5, wherein during the usage of a part of the controlled content comprising an index, processing means, associated with storage means and associated with the consuming device, sample this index present within this part of the content consumed, in order to compare it with the index previously sampled and stored, a process in which:

when the latest index is greater than or equal to that stored, then there is no demand for a new usage, when the latest index is smaller than that stored, then the difference between the two indices is calculated:

when the difference is greater than the rewind threshold period then a demand for a new usage is made, when the difference is not greater than the rewind threshold period, then there is no demand for a new usage.

7. The method according to either of claim 6, wherein the indices are introduced in packets of control data regularly disposed throughout the controlled content.

8. The method according to claim 7, wherein the processing means contain a database that associates with each controlled content, represented by an identifier for this content, at least one of the following data values:
- the initial quantity of possible usages,
- one or more encryption keys,
- an updated number of usage(s) still possible,
- the index of the latest packet of control data,
- a maximum quantity of packets of control data on which a rewind can be carried out without triggering a new usage demand.

9. The method according to claim 1, wherein the mark is a token.

10. The method according to claim 1, wherein the mark is the absence of a token.

11. The method according to claim 1, wherein within the consuming device, a database is formed that comprises, for each content controlled by the consuming device, a set of data values, called counting structure, each counting structure comprising an identifier for this content and a number, called TOV number, representing an allowed maximum number of marks able to be detected and tallied during one single usage of this controlled content.

12. The method according to claim 11, wherein the number of marks detected and charged, for the usage in progress, is compared, for each new period consumed of the controllable part, with the TOV number, in such a manner that, when the number of marks detected and charged exceeds the TOV number, the usage in progress terminates and a demand for a new usage is made.

13. The method according to claim 12, wherein each counting structure comprises a number of usages still possible for each digital content, called STP number.

14. The method according to claim 13, wherein the result of the demand for a new usage consists of:
- either the prohibition of a new usage when the STP number is zero;
- or, when the STP number is non-zero, the clearance for a new usage and hence the decrease of the STP number.

15. The method according to claim 11, wherein each counting structure contains a number, called usage margin, representing an additional maximum number of marks that can be detected and tallied with respect to the TOV number, in such a manner that, when the number of marks detected and tallied exceeds the sum of the TOV number and of the usage margin, the usage in progress terminates and a demand for a new usage is made.

16. The method according to claim 15, wherein each counting structure comprises a number of usages still possible for each digital content, called STP number and wherein the result of the demand for a new usage consists of:
- either the prohibition of a new usage when the STP number is zero;
- or, when the STP number is non-zero, the clearance for a new usage and hence the decrease of the STP number.

17. The method according to claim 11, wherein the database for the counting structures is stored in an encrypted fashion within storage means of the consuming device, an encryption key allowing the counting structures of this database to be decrypted being contained in secure storage and processing means of the consuming device.

* * * * *